United States Patent [19]

Tapphorn et al.

[11] Patent Number: 4,597,452
[45] Date of Patent: Jul. 1, 1986

[54] DISK GRADING TERRACE PLOW

[76] Inventors: Ralph M. Tapphorn; David E. Tapphorn, both of R.R. 1 Box 2B, Grinnel, Kans. 67738 67738

[21] Appl. No.: 731,007

[22] Filed: May 6, 1985

[51] Int. Cl.⁴ .................... A01B 13/02; E02F 5/02
[52] U.S. Cl. ................. 172/574; 172/799.5; 172/413; 172/701
[58] Field of Search ............ 172/701, 715, 799.5, 172/701.1, 701.3, 574, 569, 454, 459, 460, 413, 786, 716, 718; 37/98

[56] References Cited

U.S. PATENT DOCUMENTS

| | | | |
|---|---|---|---|
| 561,988 | 6/1896 | Harmon | 172/574 |
| 759,489 | 5/1904 | Weeks | 172/569 X |
| 1,500,367 | 7/1924 | Caughey | 172/574 |
| 1,888,128 | 11/1932 | Hester | 172/574 |
| 1,951,072 | 3/1934 | Theiler | 172/574 X |
| 2,780,158 | 2/1957 | Pursche | 172/212 X |
| 3,045,765 | 7/1962 | Cox | 172/212 |
| 4,422,512 | 12/1983 | Hodgson | 172/454 |

FOREIGN PATENT DOCUMENTS 484827 11/1975 U.S.S.R. .................... 172/701

*Primary Examiner*—Richard J. Johnson

[57] ABSTRACT

A disk grading terrace plow comprising a plurality of disk units mounted below an angled beam frame which is towed at an angle of 40 to 45 degrees to the direction of tow via a tractor connected to an elevated hitch beam mounted to the said angle beam frame in a lateral position which balances draft torques. Alignment of the said disk units, each comprising a disk blade, shank and attachment structure, along the angled beam frame is such that dirt is excavated from a furrow and discharged both vertically and laterally in front of the next sequential rearward disk. The excavated dirt then continues to shift from disk-to-disk in a compound grading manner until all the dirt is shifted around the rearmost disk blade. The depth of cut for the disk grading terrace plow is controlled by adjusting hydraulic cylinders connected to a front and rear gauge wheel, respectively. Construction or maintenance of a terrace ridge is achieved by grading dirt toward the centerline of the ridge at speeds of 4 to 5 miles per hour wherein limitations associated with using conventional plows is overcome with this invention by grading dirt beyond the throw of a single disk or plow blade with each pass.

3 Claims, 4 Drawing Figures

DISK GRADING TERRACE PLOW

REFERENCES CITED

U.S. Pat. Nos.:
3,045,765; July, 1962; Cox et al.; 172/212
3,345,764; October, 1967; Malsam; 37/110
4,422,512; December, 1983; Hodgson Jr. et al.; 172/454.

BACKGROUND OF THE INVENTION

The Prior Art

Terraces have been conventionally constructed using dozers, scrapers, graders, elevating loaders, and terracing machines as described and summarized in U.S. Pat. No. 3,345,764 issued to Malsam. More recently, a plow utilizing a pair of disk gangs for constructing narrow-based terraces was disclosed in U.S. Pat. No. 4,422,512 to Hodgson Jr. et al. All of the patents cited above disclose terracing machines used primarily in the construction of original terrace structures without addressing the problem of maintenance. By implication all of these terracing machines can be utilized for terrace maintenance, although, with the exception of the device disclosed in the U.S. Pat. No. 4,422,512 to Hodgson Jr. et al., the associated cost for capital investment and operation expenses for most devices renders this approach impractical for the landowner or operator. Heretofore, maintenance of existing terraces has been performed on a periodic basis by utilizing conventional disk and moldboard plows or reversible disk plows as disclosed in U.S. Pat. No. 3,045,765 to Cox et al. The major limitation associated with these conventional plows is the inability to move dirt laterally beyond the throw of a single disk or plow blade. Stacking of the dirt in a ridge with such devices is achieved solely by repeated passes in the same direction after sufficient packing of the loose dirt. Oftentimes, because of the inefficiency and soil disturbing nature of this maintenance method, the overall maintenance program of a terrace structure is abandoned.

Our invention relates to a grading device utilizing a plurality of dirt compounding disk blades arranged sequentially along the underside of an angled beam so as to grade dirt laterally from disk-to-disk. With this invention periodic terrace maintenance is easily achieved at a reduced cost of operation and capital investment. Furthermore, the disclosed invention is useful in other dirt grading applications such as original construction of narrow-based terraces, roadbed shouldering, ditching, diking, and surface excavating.

BRIEF SUMMARY OF THE INVENTION

The invention provides a new grading device for terrace maintenance, ridge construction, ditching, and surface excavating in which a plurality of disk units is mounted below an angled beam frame and spaced laterally along the beam such that dirt is cut and shifted laterally from disk-to-disk in a compound grading manner. Each disk unit after the foremost disk unit cuts a furrow of dirt and receives the discharged dirt from the previous forward disk. The compounded dirt load is shifted laterally and discharged in front of the next sequential rearward disk unit. This process continues until all of the dirt is discharged laterally in a ridge alongside the rearmost disk. Each disk blade of the said disk units is mounted to an L-shaped vertical shank at an angle such that the dirt is pitched both laterally and vertically with a slight rearward throw. This angle is set by requiring that a representative tangential vector emanating from the edge of the disk blade in the direction of the dirt discharge be at a rearward angular tilt of 10 degrees beyond an orthoganal plane to the direction of tow.

The angled beam frame of this invention is connected to an elevated hitch assembly and positioned approximately over the third disk unit as disclosed in this four disk unit embodiment. This arrangement ensures a first order balance of draft torques acting about the vertex of the support structure for the elevated hitch beam. Under draft load conditions, the clockwise torque of the two disks to the left of the elevated hitch approximately balances the counterclockwise torque of the right rearmost disk with the compounded dirt load. Final adjustment of draft torque balance is achieved by adjusting front and rear cutting depths as required.

The hitch beam is elevated above the angled beam frame with a leg support structure to permit the dirt to move unobstructed in a lateral direction. The hitch beam is returned to the elevation level of a tractor drawbar by means of a downwardly angled beam connected to a pivotal clevis hitch assembly. In this embodiment, two gauge wheels located near the front and rear of the angled beam frame are utilized for controlling depth of cut.

BRIEF DESCRIPTION OF THE DRAWINGS

A preferred embodiment of the disk grading terrace plow is detailed below with reference to the following drawings, wherein.

DETAILED DESCRIPTION OF THE INVENTION

Figure 1:
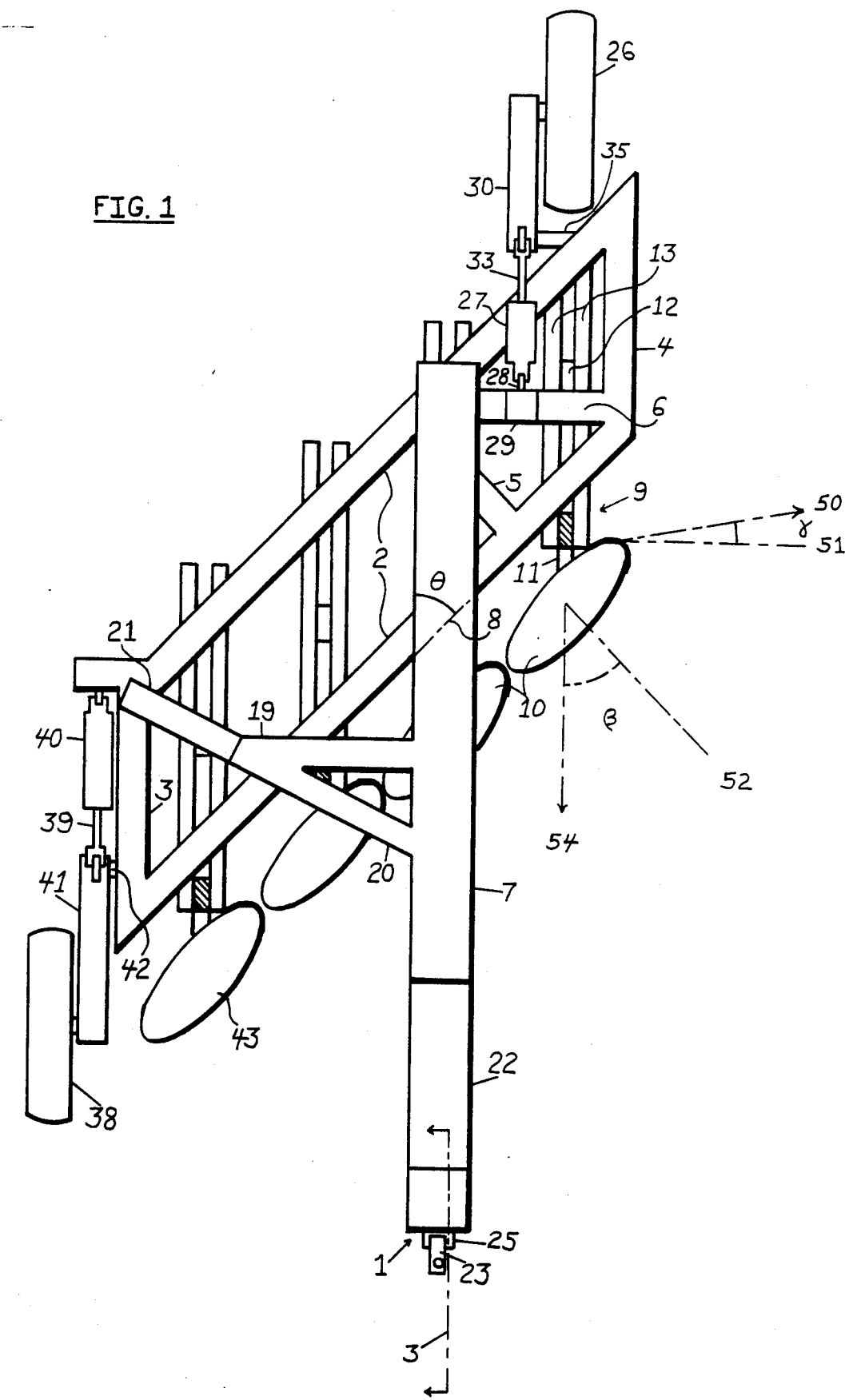
FIG. 1 is a top plain view of the disk grading terrace plow.
Figure 2:
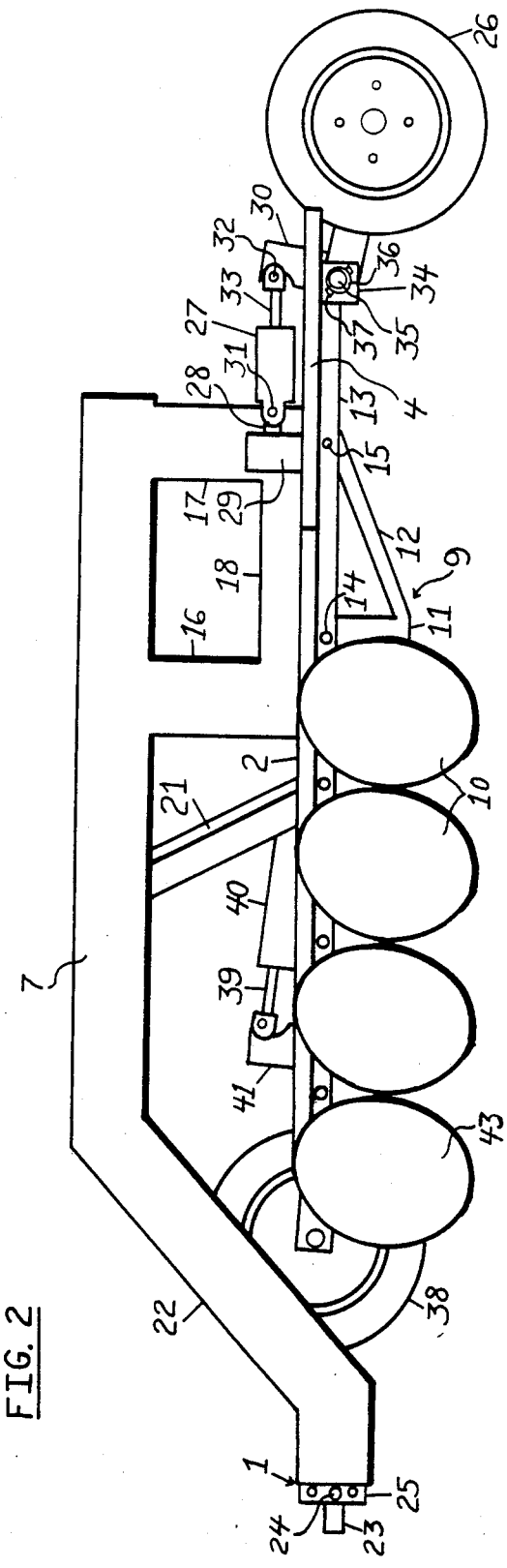
FIG. 2 is a side elevational view of the preferred embodiment of our invention.
Figure 3:
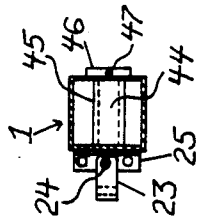
FIG. 3 is a sectional side elevation view of the clevis hitch assembly associated with the hitch beam of this invention.

Referring now to the FIGS. 1, 2, and 3, the disk grading terrace plow is to be drawn by a tractor connected to the clevis hitch assembly 1. The angled beam frame 2, consisting of longitudinal beams 3 and 4 and other support beams 5 and 6, is mounted at an angle $\theta$ to the hitch beam 7, as measured between the broken line 8 and the edge of the hitch beam 7. The angled beam frame 2 provides the attachment structure for a plurality of disk units referred to as a single assembly unit 9 in FIGS. 1 and 2. The angle $\theta$ is set at 42 degrees for this preferred embodiment, but other angles in the range from 40 to 45 degrees are acceptable.

Each disk unit assembly 9, comprising the disk blade 10, shank 11, shank strut bracket 12 and a pair of L beams 13 is attached to the lower side of the angled beam frame 2 either by welding as shown in this embodiment or by U bolts and straps clamped around the angled beam frame 2. The lateral spacing of each disk unit assembly 9 is determined by the size of disk blade used wherein the disk units are mounted with minimal overlap between edges of disk blades 10. This embodiment shows all disk blades 10 having the same diameter.

Other embodiments include disk blades 10 of progressively larger diameters mounted at increasingly wider lateral spacings to achieve the minimal overlap between disk blade edges. Mounting of the disk blade 10 to the shank 11 will be described in more detail later. The shank 11 and shank strut bracket 12 are attached to the pair of parallel L beams 13 with bolt pins 14 and 15, respectively.

The hitch beam 7 is elevated above the angled beam frame 2 via the support beam posts 16 and 17 wherein the elevation clearance is at a height of approximately 2 feet above the angled beam frame 2 to allow the vertically pitched dirt from each disk blade 10 to pass laterally under the hitch beam without obstruction. Brace beam 18, associated with the hitch support beam posts 16 and 17, provides additional mounting strength and attachment area for the hitch beam structure 7. Two structural suppost beams 5 and 6 mounted within the angled beam frame 2 provide a foundation for attaching the hitch beam 7 with box structure (16, 17, and 18). In this embodiment, the hitch beam 7 is positioned over the third disk unit from the foremost disk unit 43 to equalize draft torques acting about the vertex of the support structure (16, 17, and 18) for the hitch beam 7.

Structural support beams 19 and 20 are attached to the angled beam frame 2 via the downwardly angled beam 21. All attachments of the hitch support beams 16, 17, 18 and 21 to the angled beam frame 2 as shown in this embodiment are welded. Other embodiments utilizing end-beam flanges with bolt holes for attaching removably to the angled beam frame via cap screw bolts or bolt pins are included in this invention.

A downwardly angled beam 22 returns the hitch beam 7 to the elevation of the tractor drawbar for towing via the clevis hitch assembly 1. Adjustments for various tractor drawbar heights are achieved by moving the hitch clevis 23 and pin 24 up or down in the mating channel support bracket 25.

A rear gauge heel 26 is designed to travel in the cut of the rearmost disk unit 9. The hydraulic cylinder 27 (not shown with hydraulic hoses for clarity), connected between ear flange 28 of the support post 29 and the L-shaped pivotal lifting arm 30 via coupling pins 31 and 32, controls the depth of cut for the disk grading terrace plow. By extending the piston rod 33 of hydraulic cylinder 27, the L-shaped pivotal lifting arm 30 and shaft 35 rotates clockwise (FIG. 2 view) within the sleeve support bracket 34 thereby rolling the rear gauge wheel 26 forward and under the angled beam frame 2 causing the disk grading terrace plow to raise out of the ground. Conversely, the depth of cut can be increased by retracting the piston rod 33 of the rear hydraulic cylinder 27.

The L-shaped pivotal lifting arm 30 is secured in the pivotal support bracket 34 via the shaft 35, collar 36, and locking pin 37.

The forward gauge wheel 38 is designed similar to the rear gauge wheel such that extension of the piston rod 39 of hydraulic cylinder 40 causes the L-shaped lifting arm 41 and shaft 42 to rotate counterclockwise (FIG. 2 view) thereby rolling the gauge wheel 38 rearward and under the angled beam frame 2 which raises the disk grading terrace plow out of the ground. Since the forward gauge wheel 38 runs ahead of the foremost cutting disk 43 and on original ground level, this wheel serves as a gauge wheel for tilting the anled beam frame 2 about the pivotal hitch shaft 44 shown in FIG. 3. This tilt feature allows the disk grading terrace plow to cut deeper on one side or the other depending on the angle of tilt.

Referring to FIG. 3, the pivotal hitch shaft 44 is mounted within sleeve 45 of the clevis hitch beam asembly 1 and secured with collar 46 and pin 47. The channel bracket 25 is welded to the pivotal hitch shaft 44.

Figure 4:
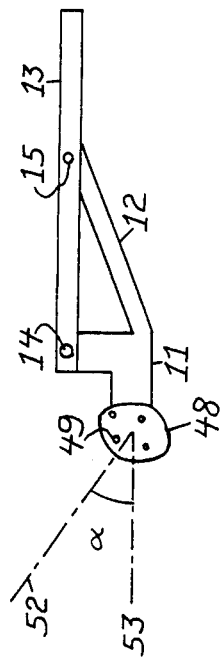
FIG. 4 is an elevation view of one of the disk unit assemblies utilized in the invention embodiment shown with the disk blade removed.

Referring now to FIGS. 1 and 4, the disk blade 10 is mounted to a concave disk socket plate 48 via four plow bolts fastened in holes 49. The concaved disk socket plate 48 is fixedly mounted to the L-shaped shank 11 by welding, and is positioned such that a representative tangential vector 50 emanating from the edge of the disk blade 10 in the direction of discharge for the dirt is at an angle, $\gamma$, of 10 degrees toward the rear of the machine from an orthogonal plane 51 to the direction of tow. With this mounting design, the angular mounting position of disk socket plate 48 is further defined by requiring that an orthogonal line projection 52 emanating from its center form an angle $\alpha$ (FIG. 4) of 35 to 40 degrees to the horizonal plane 53 and an angle $\beta$ (FIG. 1) of 35 to 40 degrees to direction of intended tow 54. The variation in angle is dependent on the diameter of disk blade 10 utilized for a particular embodiment. For a 30 inch diameter disk blade 10, the smaller angle is selected for $\alpha$ and $\beta$, while the larger angle is used for a 36 inch diameter disk blade 10. The angles $\alpha$ and $\beta$ are equal to one-half the arc angle subtended by the disk blade 10 plus the 10 degrees of angular tilt defined for tangential vector 50.

In operation, the disk grading terrace plow excavates dirt with each disk blade 10 shifting the dirt laterally and vertically with discharge in front of the next sequential disk toward the rear of the machine. Finally, all the dirt from the rearmost disk unit 9 is discharged in a ridge alongside the last disk. The disk grading terrace plow is designed to operate optimally at speeds of 4 to 5 miles per hour in order to ensure that the dirt discharged from each disk blade 10 is at the maximum vertical height by the time the next sequential disk toward the rear of the plow moves forward into a position to begin shifting the compounded dirt load laterally.

By plowing along both sides of an existing terrace ridge, dirt is graded toward the centerline of the terrace ridge thereby rebuilding the terrace structure to its original height and width. If rebuilding of the terrace structure requires moving most of the dirt from the uphill side of the ridge so as to construct a channel, then the disk grading terrace plow is adjusted to cut deeper on the channel side of the terrace ridge while returning with a shallow cut used primarily to shape and pack the rebuilt ridge on the back side.

Various cutting depths, including grading on a slope, are easily achieved with the disk grading terrace plow by adjusting the hydraulic cylinders 27 and 40 connected to the gauge wheels 26 and 38, respectively.

Although, our invention has been directed toward terrace reconstruction, other applications include ditching, diking, and roadbed shouldering. In these applications, as well as terracing, other embodiments utilizing only portions of the disk grading terrace plow are envisioned. For example, by mounting only the angled beam frame 2 with a plurality of disk units 9 to the circle turn frame of a motor grader, the device could be used in a manner similar to the moldboard blade of a grader. In this case, however, the invention is more efficient for grading dirt since the dirt is pitched laterally from each disk element, thereby minimizing the frictional drag associated with the conventional moldboard blade.

As indicated in the disclosure of this invention, many embodiments are possible which do not modify the scope of the invention.

We claim:

1. A grading device comprising;
   (a) an angled beam frame, comprising two parallel angled beams connected at each of the extreme ends by a longitudinal beam, which said angled beam frame is fixedly mounted to an elevated hitch beam for towing via a tractive vehicle in which the said angled beam frame is aligned between 40 and 45 degrees to the direction of tow, a grading device having a plurality of disk units fixedly mounted to the lower side of said angle beam frame at closely adjacent lateral positions along the angled beam thereof which permit a furrow to be excavated with each said disk unit and discharged laterally and rearwardly in a compound grading manner in front of the next sequential rearward disk unit as the device is towed forward thereby grading dirt laterally across the device and around the rearmost disk unit;
   (b) said dirt compounding disk units each comprising a concave disk blade removably connected via plow bolt to a disk socket plate in which the said disk socket plate is fixedly mounted to an L-shaped vertical shank at an angled position to the direction of intended tow such that a representative tangential vector emanating from the edge of said disk blade in the direction of discharge for the dirt from said disk blade is at a rearward angle of 5 to 15 degrees from an orthogonal plane to the direction of tow, the said L-shaped vertical shank including a brace strut is connected removably to a pair of parallel L beams mounted to a lower side of said angled beam frame;
   (c) a forward gauge wheel mounted outside the longitudinal beam of said angle beam frame, having hydraulic power adjustment means for elevating the forwardmost end of said angled beam frame above the ground level thereby controlling the excavating depth and grading slope of said grading device;
   (d) a rear gauge wheel mounted to the rear of said angled beam frame and directly in line with the excavated furrow cut by said rearmost disk unit, having hydraulic power adjustment means for elevating the rearwardmost end of said angled beam above the ground level thereby controlling the excavating depth of said grading device;
   a swivelled hitch secured to said longitudinal beam for connecting the grading device to a towing vehicle.

2. A grading device as claimed in claim 1, wherein said elevated hitch beam is fixedly mounted to the upper side of said angled beam frame at a lateral position to balance clockwise and counterclockwise draft torques.

3. A grading device as claimed in claim 1, wherein the hitch includes a clevis adjustably pinned in a channel bracket for matching the drawbar height of a towing vehicle, the channel bracket fixedly connected to a pivotal shaft pinned within a sleeve secured to the hitch beam, said pivotal shaft and sleeve of the tow hitch permitting swiveling of the hitch about an axis extending in the direction of tow.

* * * * *